United States Patent
Ito et al.

(10) Patent No.: US 12,187,083 B2
(45) Date of Patent: Jan. 7, 2025

(54) HEAVY DUTY TIRE AND PRODUCTION METHOD FOR HEAVY DUTY TIRE

(71) Applicant: SUMITOMO RUBBER INDUSTRIES, LTD., Kobe (JP)

(72) Inventors: Tadashi Ito, Kobe (JP); Tetsuya Kitano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 107 days.

(21) Appl. No.: 18/124,635

(22) Filed: Mar. 22, 2023

(65) Prior Publication Data

US 2023/0302850 A1    Sep. 28, 2023

(30) Foreign Application Priority Data

Mar. 23, 2022  (JP) .................................. 2022-046572
Feb. 17, 2023  (JP) .................................. 2023-023441

(51) Int. Cl.
| | |
|---|---|
| *B60C 9/08* | (2006.01) |
| *B60C 3/04* | (2006.01) |
| *B60C 9/02* | (2006.01) |
| *B60C 15/04* | (2006.01) |
| *B60C 15/06* | (2006.01) |
| *B29D 30/06* | (2006.01) |

(52) U.S. Cl.
CPC .............. *B60C 3/04* (2013.01); *B60C 9/0292* (2013.01); *B60C 15/04* (2013.01); *B60C 15/0603* (2013.01); *B60C 15/0607* (2013.01); *B29D 30/0601* (2013.01); *B60C 2015/061* (2013.01)

(58) Field of Classification Search
CPC ... B60C 9/0292; B60C 15/04; B60C 15/0603; B60C 15/0607; B60C 2015/061
See application file for complete search history.

(56) References Cited

U.S. PATENT DOCUMENTS

| | | | |
|---|---|---|---|
| 5,196,076 A | 3/1993 | Ochiai | |
| 2018/0126802 A1* | 5/2018 | Sato | .................... B60C 15/0607 |
| 2023/0415519 A1* | 12/2023 | Ito | ....................... B60C 15/0607 |

FOREIGN PATENT DOCUMENTS

| | | | |
|---|---|---|---|
| EP | 3 318 424 A1 | | 5/2018 |
| JP | 08-048116 A | * | 2/1996 |
| JP | 2005-112042 A | | 4/2005 |
| JP | 2007-230515 A | | 9/2007 |

OTHER PUBLICATIONS

Machine translation for Japan 08-048116 (Year: 2024).*
Extended European Search Report for European Application No. 23163098.9, dated Jul. 24, 2023.

* cited by examiner

*Primary Examiner* — Steven D Maki
(74) *Attorney, Agent, or Firm* — Birch, Stewart, Kolasch & Birch, LLP

(57) ABSTRACT

A contour CL of a carcass 12 includes a curved portion 44 and an inversely curved portion 46. A boundary between the curved portion 44 and the inversely curved portion 46 is an inflection point PV. A part or an entirety of the curved portion 44 is represented by a first arc. A part or an entirety of the inversely curved portion 46 is represented by a second arc. The first arc and the second arc are tangent to each other at the inflection point PV. A ratio (X/W) of a distance X in an axial direction to a distance W in the axial direction is not less than 70% and not greater than 85%. A ratio (Y/H) of a distance Y in a radial direction to a distance H in the radial direction is not less than 15% and not greater than 22%.

10 Claims, 7 Drawing Sheets

HEAVY DUTY TIRE AND PRODUCTION METHOD FOR HEAVY DUTY TIRE

CROSS-REFERENCE TO RELATED APPLICATIONS

This application claims priority on Japanese Patent Application No. 2022-46572 filed on Mar. 23, 2022, and Japanese Patent Application No. 2023-23441 filed on Feb. 17, 2023, and the entire contents of the Japanese patent applications are incorporated herein by reference.

TECHNICAL FIELD

The present invention relates to heavy duty tires and production methods for heavy duty tires.

BACKGROUND ART

A large load is applied to each bead portion of a heavy duty tire. In the tire, deformation and restoration are repeated. In order to prevent occurrence of damage to the bead portion, studies have been conducted to improve bead durability (see, PATENT LITERATURE 1 below).

CITATION LIST

Patent Literature

PATENT LITERATURE 1: Japanese Laid-Open Patent Publication No. 2005-112042

SUMMARY OF THE INVENTION

Technical Problem

Various measures such as increasing the thickness of a component included in the bead portion and newly adding a component such as a filler are taken in order to improve bead durability. Such measures improve bead durability. On the other hand, the mass of the tire is increased.

The increase in mass causes an increase in rolling resistance. From consideration for the environment, improvement of fuel economy is required for vehicles. For tires, establishment of a technology capable of improving bead durability without causing an increase in rolling resistance is required.

The present invention has been made in view of such circumstances. An object of the present invention is to provide a heavy duty tire and a production method for a heavy duty tire that can achieve improvement of bead durability without causing an increase in rolling resistance.

Solution to Problem

A heavy duty tire according to an aspect of the present invention includes a pair of beads and a carcass extending on and between a first bead and a second bead out of the pair of beads. Each of the beads includes a core and an apex located radially outward of the core. The carcass includes a carcass ply. The carcass ply includes a large number of carcass cords aligned with each other, and each of the carcass cords is a steel cord. In a meridian cross-section of the tire, a contour of the carcass includes an outwardly bulging curved portion and an inwardly recessed inversely curved portion located radially inward of the curved portion. The inversely curved portion is connected to the curved portion, and a boundary between the curved portion and the inversely curved portion is an inflection point. A part or an entirety of the curved portion is represented by a first arc including the inflection point, and a part or an entirety of the inversely curved portion is represented by a second arc including the inflection point. The first arc and the second arc are tangent to each other at the inflection point. A ratio of a distance in an axial direction from an equator plane of the tire to the inflection point to a distance in the axial direction from the equator plane to an axially outer end of the contour of the carcass is not less than 70% and not greater than 85%. A ratio of a distance in a radial direction from a bead base line of the tire to the inflection point to a distance in the radial direction from the bead base line to a point of intersection of the contour of the carcass and the equator plane is not less than 15% and not greater than 22%.

Preferably, in the heavy duty tire, the core includes a core body, and the core body includes a wire wound in a circumferential direction. The core body has a bottom surface located so as to face a seat of a rim onto which the tire is fitted. In the meridian cross-section of the tire, a contour of the bottom surface is represented by a straight line. An angle formed between a tangent line that is tangent to the contour of the carcass at the inflection point and the straight line representing the contour of the bottom surface is not less than 25 degrees and not greater than 30 degrees.

Preferably, in the heavy duty tire, a ratio of a thickness of the apex to a thickness of the tire at the inflection point is not less than 42% and not greater than 50%.

Preferably, in the heavy duty tire, a movement distance of the inflection point when the tire is fitted on a rim and an internal pressure of the tire is changed from 50 kPa to a normal internal pressure is not greater than 5 mm.

Preferably, in the heavy duty tire, the apex includes an inner apex and an outer apex located radially outward of the inner apex. The inner apex has an outer end tapered outward in the radial direction. The carcass ply has a ply body which extends between the cores of the beads, and a pair of turned-up portions which are connected to the ply body and turned up around the respective cores from the inner side toward the outer side in the axial direction. The inflection point is located, in the axial direction, between a radially outer end of the core and the outer end of the inner apex, and is located, in the radial direction, between an end of the turned-up portion and the outer end of the inner apex.

A production method for a heavy duty tire according to an aspect of the present invention is a method for producing a tire including a pair of beads and a carcass extending on and between a first bead and a second bead out of the pair of beads. The production method includes: a step of preparing a green tire that is in an unvulcanized state of the tire, and a step of pressurizing and heating the green tire in a mold. A ratio of a clip width of the mold to a rim width of a rim onto which the tire is fitted is not less than 1.02 and not greater than 1.17.

Advantageous Effects of the Invention

According to the present invention, a heavy duty tire that can achieve improvement of bead durability without causing an increase in rolling resistance is obtained.

DETAILED DESCRIPTION

Figure 1:
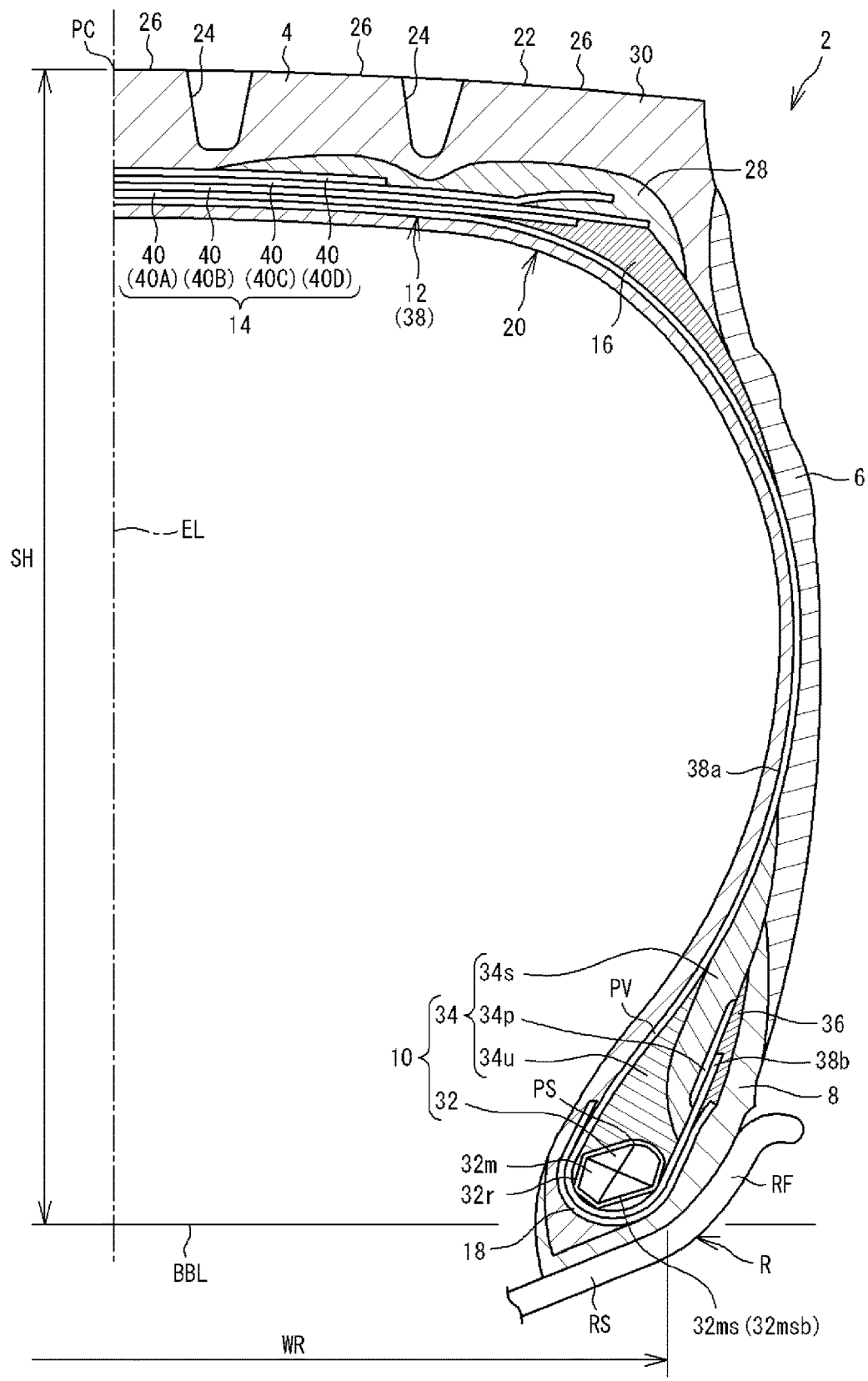
FIG. 1 is a cross-sectional view showing a part of a heavy duty tire according to an embodiment of the present invention.

The following will describe in detail the present invention based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state.

A state where the tire is fitted on the normal rim, the internal pressure of the tire is adjusted to 50 kPa, and no load is applied to the tire is referred to as a reference state.

In the present disclosure, unless otherwise specified, the dimensions and angles of each component of the tire are measured in the normal state.

The dimensions and angles of each component in a meridian cross-section of the tire, which cannot be measured in a state where the tire is fitted on the normal rim, are measured in a cut surface of the tire obtained by cutting the tire along a plane including the rotation axis of the tire. In this measurement, the tire is set such that the distance between right and left beads is made equal to the distance between the beads in the tire that is fitted on the normal rim. A component, of the tire, which cannot be confirmed in a state where the tire is fitted on the normal rim is confirmed in the above-described cut surface.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, a tread portion of the tire is a portion of the tire that comes into contact with a road surface. A bead portion is a portion of the tire that is fitted to a rim. A side portion is a portion of the tire that extends between the tread portion and the bead portion. The tire includes a tread portion, a pair of bead portions, and a pair of side portions as portions thereof.

In the present disclosure, of the components included in the tire, the hardness of each component formed from a crosslinked rubber is measured according to the standards of JIS K6253 under a temperature condition of 23° C. using a type A durometer.

In the present disclosure, the number of cords included per 5 cm of a tire component, including aligned cords, is represented as the density of cords included in this component (unit: ends/5 cm). Unless otherwise specified, the density of the cords is obtained in a cross-section of the component obtained by cutting the component along a plane perpendicular to the longitudinal direction of the cords.

FIG. 1 shows a part of a heavy duty tire 2 (hereinafter, also referred to simply as "tire 2") according to an embodiment of the present invention. The tire 2 is mounted to a vehicle such as a truck and a bus.

FIG. 1 shows a part of a cross-section (hereinafter, meridian cross-section) of the tire 2 along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2. An alternate long and short dash line EL represents the equator plane of the tire 2.

The tire 2 is fitted onto a rim R. The rim R is a normal rim. The interior of the tire 2 is filled with air to adjust the internal pressure of the tire 2. The tire 2 fitted on the rim R is also referred to as a tire-rim assembly. The tire-rim assembly includes the rim R and the tire 2 fitted on the rim R.

The rim R includes a seat RS and a flange RF. When the tire 2 is fitted onto the rim R, the seat RS comes into contact with a bead portion from the radially inner side, and the flange RF comes into contact with the bead portion from the axially outer side.

In FIG. 1, a solid line BBL extending in the axial direction is a bead base line. This bead base line BBL is a line that defines the rim diameter (see JATMA or the like) of the rim R. In FIG. 1, a length indicated by reference sign WR is the rim width (see JATMA or the like) of the rim R.

The tire 2 includes a tread 4, a pair of sidewalls 6, a pair of chafers 8, a pair of beads 10, a carcass 12, a belt 14, a pair of cushion layers 16, a pair of steel fillers 18, and an inner liner 20.

The tread 4 comes into contact with a road surface at a tread surface 22 thereof. On the tread 4 of the tire 2, four circumferential grooves 24 are formed. Accordingly, five land portions 26 are formed in the tread 4. These land portions 26 are aligned in the axial direction.

The tread 4 includes a base portion 28 and a cap portion 30. In the tread 4 of the tire 2, a pair of base portions 28 are provided. These base portions 28 are disposed with the equator plane EL therebetween. Each base portion 28 covers a portion at an end of the belt 14. The base portion 28 is formed from a crosslinked rubber that has low heat generation properties. The cap portion 30 is located radially outward of the base portion 28. The cap portion 30 includes the tread surface 22. The cap portion 30 is formed from a crosslinked rubber for which wear resistance and grip performance are taken into consideration.

In FIG. 1, reference sign PC indicates the point of intersection of the tread surface 22 and the equator plane EL. The point of intersection PC corresponds to the equator of the tire 2. The equator PC is the radially outer end of the tire 2.

In FIG. 1, a length indicated by reference sign SH is the distance in the radial direction from the bead base line BBL to the equator PC of the tire 2. The distance SH in the radial direction is the cross-sectional height (see JATMA or the like) of the tire 2.

Each sidewall 6 is connected to an end of the tread 4. The sidewall 6 extends radially inward from the end of the tread 4. The sidewall 6 is located radially inward of the tread 4. The sidewall 6 is formed from a crosslinked rubber for which cut resistance is taken into consideration.

Each chafer 8 is located radially inward of the sidewall 6. The chafer 8 comes into contact with the rim R. The chafer 8 is formed from a crosslinked rubber for which wear resistance is taken into consideration.

Each bead 10 is located axially inward of the chafer 8. The bead 10 is located radially inward of the sidewall 6. The bead 10 includes a core 32 and an apex 34. The core 32 extends in the circumferential direction. The apex 34 is located radially outward of the core 32. The apex 34 has a tapered shape.

A position indicated by reference sign PS is the radially outer end of the core 32. In the present disclosure, the radially outer end PS of the core 32 is represented by the radially outer end of a core body 32m described later.

The core 32 includes a core body 32m and a wrapping layer 32r.

The core body 32m is a ring extending in the circumferential direction. Although not shown, the core body 32m includes a wire made of steel and wound in the circumferential direction. A cross-sectional shape of the core body 32m is shaped by winding the wire in a regular manner. Accordingly, in a cross-section of the core body 32m, cross-sectional units each including a plurality of wire cross-sections aligned substantially in the axial direction are stacked in a plurality of stages substantially in the radial direction. The cross-sectional shape of the core body 32m is represented by a line that circumscribes the core body 32m. As shown in FIG. 1, the core body 32m has a hexagonal cross-sectional shape. The core body 32m may have a quadrangular cross-sectional shape.

The core body 32m generally has six side surfaces 32ms. As shown in FIG. 1, one side surface 32msb out of the six side surfaces 32ms is located so as to face the seat RS of the rim R. In the present disclosure, the side surface 32msb which is located so as to face the seat RS of the rim R is a bottom surface of the core body 32m. The core body 32m has the bottom surface 32msb which is located so as to face the seat RS of the rim R. In the meridian cross-section of the tire 2, the contour of the bottom surface 32msb is represented by a straight line.

The wrapping layer 32r surrounds the core body 32m. The wrapping layer 32r covers the core body 32m. The wrapping layer 32r prevents the core body 32m from falling apart.

The configuration of the wrapping layer 32r is not particularly limited as long as the wrapping layer 32r can prevent the core body 32m from falling apart. The wrapping layer 32r is composed of a cord helically wound around the core body 32m, a rubberized fabric wrapped around the core body 32m, or the like.

The apex 34 includes an inner apex 34u and an outer apex 34s.

The inner apex 34u extends radially outward from the core 32. The inner apex 34u is tapered outward in the radial direction. The inner apex has an outer end tapered outward in the radial direction. The outer end of the inner apex 34u is also referred to as a tip. The outer end of the inner apex 34u is located at the inner surface of the apex 34. The outer end of the inner apex 34u is the radially outer end of the boundary between the inner apex 34u and the outer apex 34s. The outer end of the inner apex 34u is located radially inward of an outer end of the apex 34. The inner apex 34u is formed from a hard crosslinked rubber. Specifically, the hardness of the inner apex 34u is not less than 83 and not greater than 98.

The outer apex 34s is located radially outward of the inner apex 34u. The outer apex 34s is thick around the outer end of the inner apex 34u, and from this outer end portion, the outer apex 34s is tapered inward in the radial direction and is tapered outward in the radial direction. An inner end of the outer apex 34s is located at the outer surface of the apex 34. The inner end of the outer apex 34s is located near the core 32. An outer end of the outer apex 34s is located radially outward of the outer end of the inner apex 34u. The outer end of the outer apex 34s is the outer end of the apex 34. The outer apex 34s is formed from a crosslinked rubber that is more flexible than the inner apex 34u. Specifically, the hardness of the outer apex 34s is not less than 45 and not greater than 65.

The apex 34 of the tire 2 can further include a ply edge strip 34p. The ply edge strip 34p has a sheet shape and is stacked on the outer apex 34s. The ply edge strip 34p forms a part of the outer surface of the apex 34. As shown in FIG. 1, an end of a turned-up portion of a carcass ply described later is stacked on the ply edge strip 34p. The ply edge strip 34p is formed from a crosslinked rubber that is harder than the outer apex 34s.

The carcass 12 is located inward of the tread 4, the pair of sidewalls 6, and the pair of chafers 8. The carcass 12 extends on and between a first bead 10 and a second bead 10 out of the pair of beads 10.

The carcass 12 includes at least one carcass ply 38. The carcass 12 of the tire 2 is composed of one carcass ply 38. The carcass ply 38 is turned up around each core 32 from the inner side toward the outer side in the axial direction. The carcass ply 38 has a ply body 38a which extends between a first core 32 and a second core 32, and a pair of turned-up portions 38b which are connected to the ply body 38a and turned up around the respective cores 32 from the inner side toward the outer side in the axial direction.

The carcass ply 38 includes a large number of carcass cords aligned with each other. These carcass cords are covered with a topping rubber. Each carcass cord intersects the equator plane EL. In the tire 2, an angle of each carcass cord with respect to the equator plane EL (hereinafter, intersection angle of the carcass cord) is not less than 700 and not greater than 900. The carcass 12 has a radial structure. The carcass cords of the tire 2 are steel cords.

In the tire 2, an intermediate strip 36 is provided between the ply edge strip 34p and the chafer 8. As shown in FIG. 1, the intermediate strip 36 covers an end of the turned-up portion 38b from the axially outer side. The intermediate strip 36, together with the above-described ply edge strip 34p, alleviates strain generated at the end of the turned-up portion 38b. The material of the intermediate strip 36 is the same as that of the ply edge strip 34p.

The belt 14 is located between the tread 4 and the carcass 12 in the radial direction. The belt 14 includes a plurality of belt plies 40 stacked in the radial direction. The belt 14 of the tire 2 includes four belt plies 40. The four belt plies 40 are a first belt ply 40A, a second belt ply 40B, a third belt ply 40C, and a fourth belt ply 40D from the radially inner side. Among the four belt plies 40, the belt ply 40 having the largest width in the axial direction is the second belt ply 40B. An end of the second belt ply 40B is the end of the belt 14.

The width in the axial direction of the belt 14 is not less than 70% and not greater than 80% of the cross-sectional width (see JATMA or the like) of the tire 2.

Each belt ply 40 included in the belt 14 includes a large number of belt cords aligned with each other, which are not shown. The belt cords are steel cords. The density of the belt cords in each belt ply 40 is not less than 15 ends/5 cm and not greater than 30 ends/5 cm.

In each belt ply 40, the belt cords are tilted relative to the circumferential direction. In the tire 2, the direction in which the belt cords of the second belt ply 40B are tilted is opposite to the direction in which the belt cords of the third belt ply 40C are tilted. The directions in which the belt cords of the first belt ply 40A and the belt cords of the fourth belt ply 40D are tilted are set as appropriate according to the specifications of the tire 2. The tilt angle of the belt cords in each belt ply 40 is set as appropriate in a range of not less than 10 degrees and not greater than 60 degrees.

Each cushion layer 16 is located between the belt 14 and the carcass 12 (specifically, the ply body 38a of the carcass ply 38) at the end of the belt 14. In the meridian cross-section of the tire 2, the cushion layer 16 has a triangular cross-sectional shape. An inner end of the cushion layer 16 is located axially inward of the end of the belt 14. An outer end of the cushion layer 16 is located axially outward of the end of the belt 14. The outer end of the cushion layer 16 is located radially inward of an outer end of the sidewall 6. The cushion layer 16 is formed from a flexible crosslinked rubber. The cushion layer 16 alleviates strain generated at the end of the belt 14.

Each steel filler 18 is located in the bead portion. The steel filler 18 is turned up around the core 32 from the inner side toward the outer side in the axial direction along the carcass ply 38. The steel filler 18 includes a large number of filler cords aligned with each other, which are not shown. A steel cord is used as each filler cord.

A first end, of the steel filler 18, which is located on the inner side in the axial direction is located radially outward of the core 32. The position of a second end, of the steel filler 18, which is located on the outer side in the axial direction coincides with the position of the first end in the radial direction, or the second end is located radially outward of the first end. The end of the above-described turned-up portion 38b is located radially outward of the second end of the steel filler 18.

The inner liner 20 is located inward of the carcass 12. The inner liner 20 is joined to the inner surface of the carcass 12 via an insulation (not shown) formed from a crosslinked rubber. The inner liner 20 forms an inner surface of the tire 2. The inner liner 20 is formed from a crosslinked rubber that has an excellent air blocking property. The inner liner 20 maintains the internal pressure of the tire 2.

Figure 2:
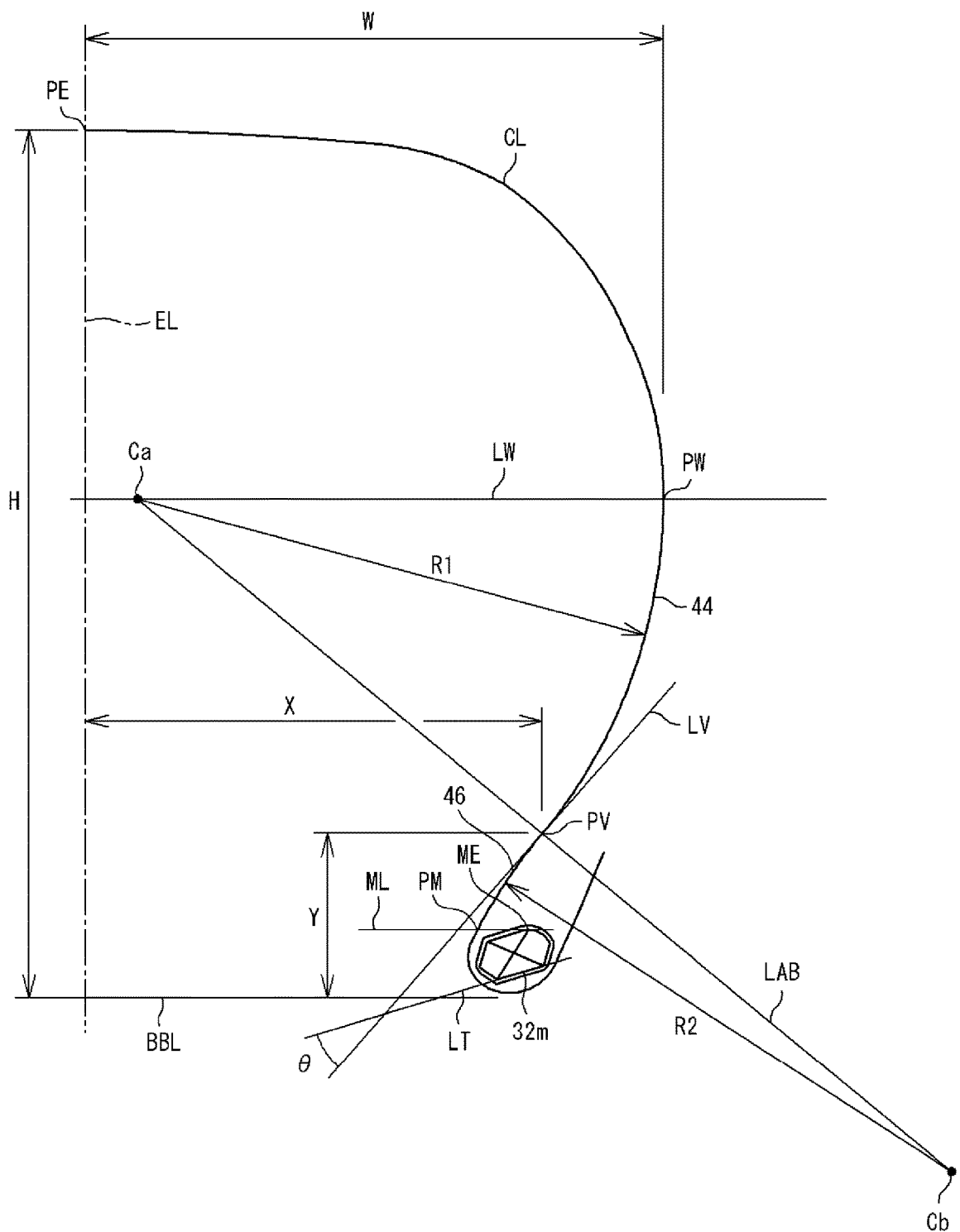
FIG. 2 is a cross-sectional view showing a contour of a carcass.

FIG. 2 shows a contour CL of the carcass 12 in the meridian cross-section of the tire 2 in the reference state.

The contour CL of the carcass 12 shown in FIG. 2 can be specified, for example, using a cross-sectional image of the tire 2 taken by a computer tomography method using X-rays (hereinafter, X-ray CT method). In this case, the cross-sectional image of the tire 2 taken by the X-ray CT method is captured in computer-aided design (CAD), and the contour CL of the carcass 12 is specified on this CAD.

Figure 3:
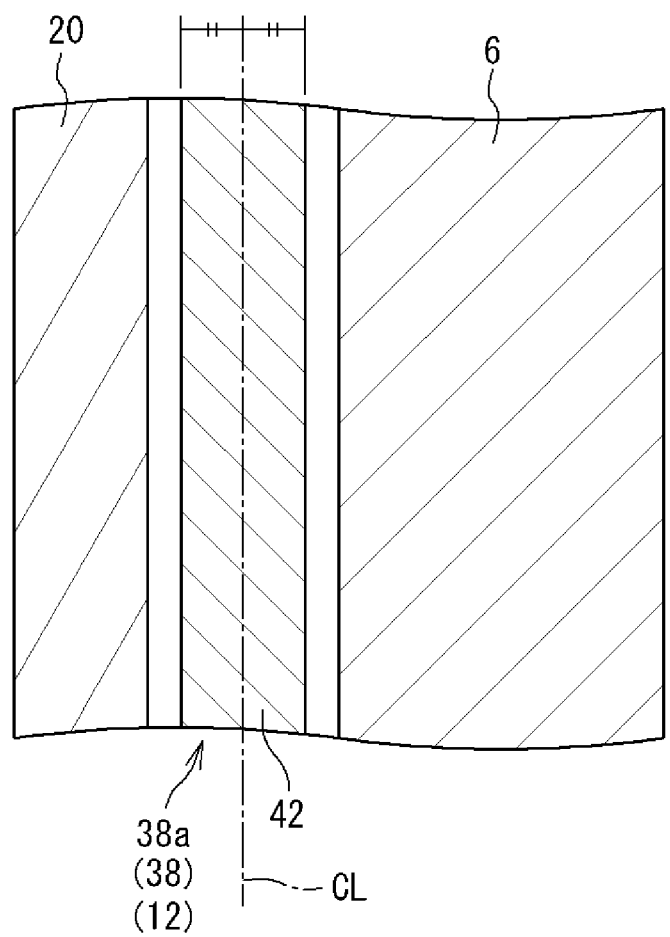
FIG. 3 is a cross-sectional view illustrating specification of the contour of the carcass.
Figure 4:
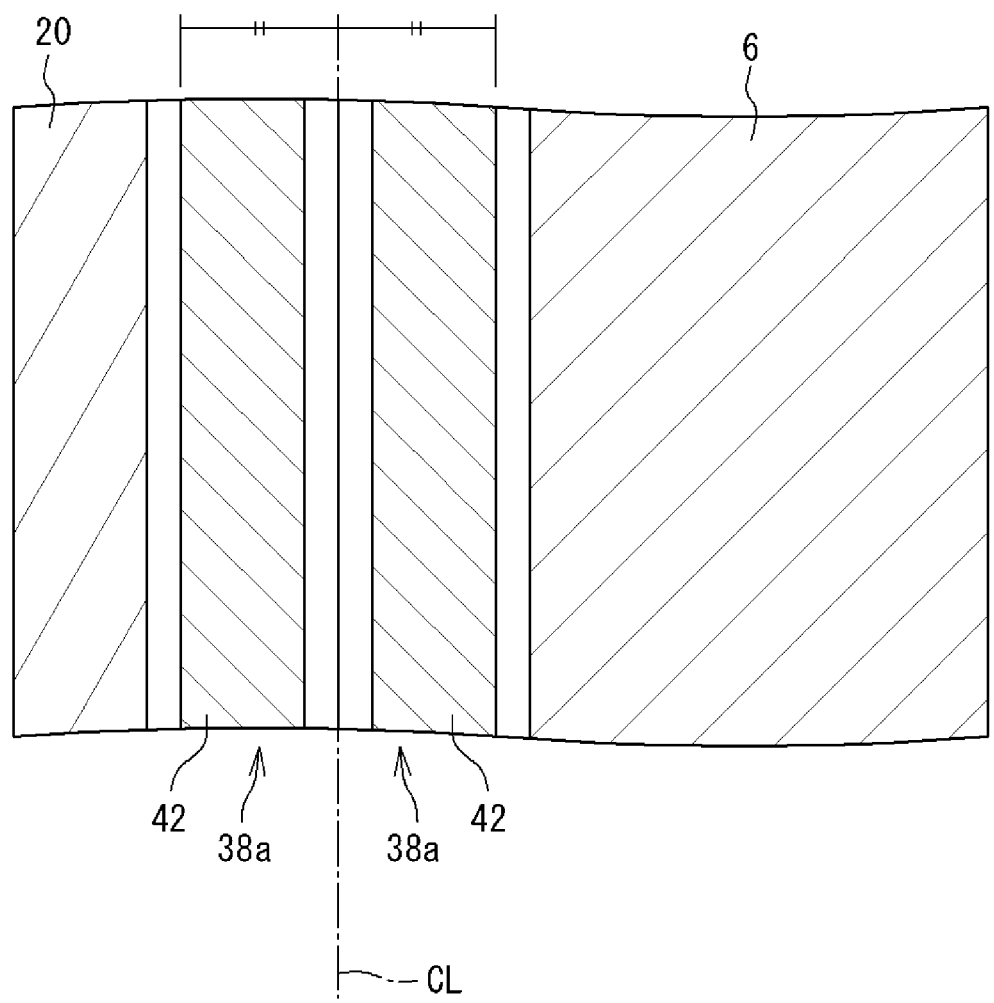
FIG. 4 is a cross-sectional view illustrating specification of a contour of another carcass.

FIG. 3 shows a part of the meridian cross-section of the tire 2. As shown in FIG. 3, the contour CL of the carcass 12 is represented by a line obtained by connecting the centers of carcass cords 42 included in the ply body 38a. FIG. 4 shows the case where the carcass 12 includes two carcass plies 38 as an example of the case where the carcass 12 includes a plurality of carcass plies 38, as a modification of the carcass 12. In this case, the contour CL of the carcass 12 is represented by a line obtained by connecting the centers between inner ends of carcass cords 42 included in the ply body 38a located on the inner side and outer ends of carcass cords 42 included in the ply body 38a located on the outer side. In FIG. 3 and FIG. 4, components located on both sides of the carcass cords 42 are topping rubbers covering the carcass cords 42, although these components are not denoted by a reference sign.

In FIG. 2, a position indicated by reference sign PE is the point of intersection of the contour CL (hereinafter, case line CL) of the carcass 12 and the equator plane EL. The point of intersection PE corresponds to the equator at the case line CL. A length indicated by reference sign H is the distance in the radial direction from the bead base line BBL to the equator PE.

In the tire 2, the equator PE coincides with the radially outer end of the case line CL. The distance H in the radial direction is also the cross-sectional height of the carcass 12.

In FIG. 2, a position indicated by reference sign PW is an axially outer end of the case line CL. The case line CL has the maximum cross-sectional width at the axially outer end PW. The axially outer end PW is a maximum width position of the case line CL. A length indicated by reference sign W is the distance in the axial direction from the equator plane EL to the axially outer end PW. Although not shown in FIG. 2, the outer end of the apex 34 is located radially inward of the maximum width position PW.

In FIG. 2, a position indicated by reference sign ME is the radially outer end of the core body 32m. A solid line indicated by reference sign ML is a straight line that passes through the radially outer end ME and extends in the axial direction. A position indicated by reference sign PM is the point of intersection of the straight line ML and the case line CL. The point of intersection PM is a position, on the case line CL, corresponding to the radially outer end ME of the core body 32m. The point of intersection PM is a reference point of the case line CL.

In the tire 2, the case line CL is formed by combining a plurality of arcs and, if necessary, connecting the arcs to each other via straight lines. The case line CL has an outwardly convex shape at the tread portion, has an outwardly convex shape at the side portion and a radially outer portion of each bead portion, and has an inwardly concave shape at a radially inner portion of each bead portion. In the bead portion, an inflection point between an outwardly bulging portion and an inwardly recessed portion exists.

In the present disclosure, outwardly bulging means a shape curved from the inner surface side toward the outer surface side of the tire, and inwardly recessed means a shape curved from the outer surface side toward the inner surface side of the tire.

The inventors have made a detailed examination of the case line CL in the reference state, and have found that bead durability is significantly improved when the case line CL has a specific shape in the bead portion in which the inflection point between the outwardly bulging portion and the inwardly recessed portion exists. As a result, the inventors have completed the present invention. The following will describe the case line CL, that is, the contour of the carcass 12, which can contribute to improvement of bead durability, based on the case line CL shown in FIG. 2.

In the tire 2, of the case line CL, a radially inner portion from the axially outer end PW, specifically, a portion from the axially outer end PW to the reference point PM includes an outwardly bulging curved portion 44 and an inwardly recessed inversely curved portion 46. The inversely curved portion 46 is located radially inward of the curved portion 44, and is connected to the curved portion 44. The boundary between the curved portion 44 and the inversely curved portion 46 is the above-described inflection point. In FIG. 2, a position indicated by reference sign PV is the inflection point.

The curved portion 44 of the tire 2 shown in FIG. 2 is represented by a single arc. This arc has a center Ca on a straight line (solid line LW in FIG. 2) that passes through the axially outer end PW and extends in the axial direction, and includes the axially outer end PW and the inflection point PV. In FIG. 2, an arrow indicated by reference sign R1 represents the radius of this arc.

Although not shown, in the tire 2, the curved portion 44 may be represented by an arc (hereinafter, arc a) having a center on the straight line LW and including the axially outer end PW and an arc (hereinafter, arc b) tangent to the arc a and including the inflection point PV. In this case, the center of the arc b is located on a straight line passing through the center of the arc a and the tangent point between the arc a and the arc b.

In the tire 2, an arc having a center on the straight line LW and including the axially outer end PW and an arc including the inflection point PV may be connected to each other via one or more arcs. In this case, the curved portion 44 is represented by a plurality of arcs that include an arc having a center on the straight line LW and including the axially outer end PW and an arc including the inflection point PV, and is formed such that adjacent two arcs are tangent to each other.

In either case, the curved portion 44 includes an arc including the inflection point PV. In the present disclosure, the arc passing through the inflection point PV is a first arc.

In the tire 2, a part or the entirety of the curved portion 44 is represented by the first arc passing through the inflection point PV.

In the tire 2 shown in FIG. 2, the inversely curved portion 46 is also represented by a single arc. This arc has a center Cb on a straight line (solid line LAB in FIG. 2) passing through the inflection point PV and the center Ca of the arc (first arc) representing the curved portion 44, and includes the inflection point PV and the reference point PM. In FIG. 2, an arrow indicated by reference sign R2 represents the radius of this arc.

Although not shown, in the tire 2, the inversely curved portion 46 may be represented by an arc (hereinafter, arc c) including the inflection point PV and an arc (hereinafter, arc d) tangent to the arc c and including the reference point PM. In this case, the center of the arc d is located on a straight line passing through the center of the arc c and the tangent point between the arc c and the arc d. In the tire 2, an arc including the inflection point PV and an arc including the reference point PM may be connected to each other via one or more arcs. In this case, the inversely curved portion 46 is represented by a plurality of arcs that include an arc including the inflection point PV and an arc including the reference point PM, and is formed such that adjacent two arcs are tangent to each other.

In either case, the inversely curved portion 46 includes an arc including the inflection point PV. In the present disclosure, the arc passing through the inflection point PV is a second arc.

If the configuration of the case line CL is unknown, the first arc representing the curved portion 44, the second arc representing the inversely curved portion 46, and the inflection point PV are obtained as follows.

The case line CL is specified on the basis of a cross-sectional image of the tire taken by the X-ray CT method. The axially outer end PW of the case line CL is obtained. An outwardly convex arc (hereinafter, outward arc) having a center on the straight line LW, which passes through the axially outer end PW and extends in the axial direction, and including the axially outer end PW is drawn. By drawing the outward arc while changing the radius thereof, an outward arc (hereinafter, first outward arc) having the maximum overlap length with the case line CL from the axially outer end PW is obtained. If the entirety of the curved portion 44 cannot be represented by the first outward arc, another outward arc having a center on a straight line passing through an end of the first outward arc and the center of the first outward arc is drawn. The outward arc is drawn while changing the radius thereof, and an outward arc (hereinafter, second outward arc) having the maximum overlap length with the case line CL from the end of the first outward arc is obtained. Tracing of the case line CL by the outward arc is repeated until the case line CL can no longer be traced by the outward arc. The end on the core body 32m side of an outward arc drawn last is specified as the inflection point PV, and this outward arc is specified as a first arc including the inflection point PV and representing a part or the entirety of the curved portion 44.

An inwardly convex arc (hereinafter, inward arc) including the inflection point PV and having a center on a straight line passing through the center of the first arc specified as described above and the inflection point PV and on the side opposite to the center of the first arc across the inflection point PV, is drawn. By drawing the inward arc w % bile changing the radius thereof, an inward arc (hereinafter, first inward arc) having the maximum overlap length with the case line CL from the inflection point PV is obtained. The first inward arc is specified as a second arc including the inflection point PV and representing a part or the entirety of the inversely curved portion 46. If the entirety of the inversely curved portion 46 cannot be drawn by the first inward arc, tracing by the inward arc is repeated until the last inward arc including the reference point PM is drawn.

In the tire 2, a part or the entirety of the inversely curved portion 46 is represented by a second arc passing through the inflection point PV. The first arc representing a part or the entirety of the curved portion 44 and the second arc representing a part or the entirety of the inversely curved portion 46 are tangent to each other at the inflection point PV. The inflection point PV is located between the center of the first arc and the center of the second arc, and the center of the first arc, the inflection point PV, and the center of the second arc are located on the same straight line.

In the case line CL shown in FIG. 2, the first arc representing the curved portion 44 and the second arc representing the inversely curved portion 46 are tangent to each other at the inflection point PV. The inflection point PV is located between the center Ca of the first arc and the center Cb of the second arc, and the center Ca of the first arc, the inflection point PV, and the center Cb of the second arc are located on the same straight line LAB.

In FIG. 2, a length indicated by reference sign X is the distance in the axial direction from the equator plane EL of the tire 2 to the inflection point PV. A length indicated by reference sign Y is the distance in the radial direction from the bead base line BBL to the inflection point PV.

In the tire 2, the ratio (X/W) of the distance X in the axial direction from the equator plane EL to the inflection point PV to the distance W in the axial direction from the equator plane EL to the axially outer end PW is not less than 70% and not greater than 85%, and the ratio (Y/H) of the distance Y in the radial direction from the bead base line BBL to the inflection point PV to the distance H in the radial direction from the bead base line BBL to the equator PE is not less than 15% and not greater than 22%.

Since the ratio (X/W) is not less than 70% and the ratio (Y/H) is not less than 15%, the inflection point PV is located at an appropriate interval from the core 32. Bending caused by the action of a load is inhibited from being large, so that strain generated in the bead portion is reduced. In the tire 2, bead durability is improved. From this viewpoint, preferably, the ratio (X/W) is not less than 75% and the ratio (Y/H) is not less than 17%.

Since the ratio (X/W) is not greater than 85% and the ratio (Y/H) is not greater than 22%, the inflection point PV is located at an appropriate interval from the maximum width position PW. Deformation of the carcass 12 at the bead portion when the tire 2 is inflated is suppressed, so that strain generated in the bead portion is reduced. In the tire 2, good bead durability is maintained. From this viewpoint, preferably, the ratio (X/W) is not greater than 80% and the ratio (Y/H) is not greater than 20%.

In the tire 2, the position of the inflection point PV which is the boundary between the curved portion 44 and the inversely curved portion 46 is determined in consideration of the position of the core 32 and the position of the axially outer end PW. In the tire 2, in particular, movement of the carcass 12 at the bead portion is effectively suppressed. Generation of strain due to the action of a load is suppressed, so that improvement of bead durability is achieved in the tire 2.

Furthermore, for the tire 2, measures such as increasing the thickness of a component included in the bead portion and newly adding a component such as a filler do not need to be taken in order to improve bead durability. On the contrary, as described later, in the tire 2, the volume of the apex 34 can be reduced. In the tire 2, an increase in mass is suppressed.

The tire 2 can achieve improvement of bead durability without causing an increase in rolling resistance. The tire 2 can also contribute to improvement of the fuel economy performance of a vehicle.

As shown in FIG. 1, the inflection point PV of the tire 2 is located, in the axial direction, between a radially outer end PS of the core 32 and the outer end of the inner apex 34*u*, and is located, in the radial direction, between the end of the turned-up portion 38*b* and the outer end of the inner apex 34*u*.

Specifically, the position of the inflection point PV coincides with the position of the radially outer end PS of the core 32 in the axial direction, or the inflection point PV is located axially outward of the radially outer end PS of the core 32. The position of the inflection point PV coincides with the position of the outer end of the inner apex 34*u* in the axial direction, or the inflection point PV is located axially inward of the outer end of the inner apex 34*u*. The position of the inflection point PV coincides with the position of the end of the turned-up portion 38*b* in the radial direction, or the inflection point PV is located radially outward of the end of the turned-up portion 38*b*. The position of the inflection point PV coincides with the position of the outer end of the inner apex 34*u* in the radial direction, or the inflection point PV is located radially inward of the outer end of the inner apex 34*u*.

In the tire 2, in particular, movement of the carcass 12 at the bead portion is effectively suppressed. Generation of strain due to the action of a load is suppressed, so that improvement of bead durability is achieved in the tire 2.

Furthermore, for the tire 2, measures such as increasing the thickness of a component included in the bead portion and newly adding a component such as a filler do not need to be taken to improve bead durability. On the contrary, as described later, in the tire 2, the volume of the apex 34 can be reduced. In the tire 2, an increase in mass is suppressed.

The tire 2 can achieve improvement of bead durability without causing an increase in rolling resistance. The tire 2 can also contribute to improvement of the fuel economy performance of a vehicle. From this viewpoint, it is preferred that the inflection point PV is located, in the axial direction, between the radially outer end PS of the core 32 and the outer end of the inner apex 34*u*, and is located, in the radial direction, between the end of the turned-up portion 38*b* and the outer end of the inner apex 34*u*. It is more preferred that the inflection point PV is located, in the axial direction, between the end of the belt 14 and the outer end of the inner apex 34*u*, and is located, in the radial direction, between the end of the turned-up portion 38*b* and the outer end of the inner apex 34*u*.

As described above, in the tire 2, the ratio (X/W) of the distance X in the axial direction from the equator plane EL to the inflection point PV to the distance W in the axial direction from the equator plane EL to the axially outer end PW is not less than 70% and not greater than 85%, and the ratio (Y/H) of the distance Y in the radial direction from the bead base line BBL to the inflection point PV to the distance H in the radial direction from the bead base line BBL to the equator PE is not less than 15% and not greater than 22%.

From the viewpoint that the tire 2 can achieve improvement of bead durability without causing an increase in rolling resistance, it is more preferred that the ratio (X/W) of the distance X in the axial direction from the equator plane EL to the inflection point PV to the distance W in the axial direction from the equator plane EL to the axially outer end PW is not less than 70% and not greater than 85%, the ratio (Y/H) of the distance Y in the radial direction from the bead base line BBL to the inflection point PV to the distance H in the radial direction from the bead base line BBL to the equator PE is not less than 15% and not greater than 22%, and the inflection point PV is located, in the axial direction, between the radially outer end PS of the core 32 and the outer end of the inner apex 34*u*, and is located, in the radial direction, between the end of the turned-up portion 38*b* and the outer end of the inner apex 34*u*. From the same viewpoint, it is further preferred that the ratio (X/W) s not less than 70% and not greater than 85%, the ratio (Y/H) is not less than 15% and not greater than 22%, and the inflection point PV is located, in the axial direction, between the end of the belt 14 and the outer end of the inner apex 34*u*, and is located, in the radial direction, between the end of the turned-up portion 38*b* and the outer end of the inner apex 34*u*.

In FIG. 2, a solid line LV is a tangent line that is tangent to the case line CL at the inflection point PV. A solid line LT is a straight line that includes a straight line representing the contour of the bottom surface 32*msb* of the core body 32*m* in the meridian cross-section of the tire 2. An angle θ is an angle formed between the tangent line LV and the straight line LT. In the present disclosure, the angle θ is an angle formed between the tangent line LV which is tangent to the contour of the carcass 12 at the inflection point PV and the straight line representing the contour of the bottom surface 32*msb*.

In the tire 2, the angle θ is preferably not less than 25 degrees and not greater than 30 degrees.

When the angle θ is set to be not less than 25 degrees, falling-down of the case line CL at the bead portion is effectively suppressed. Bending caused by the action of a load is inhibited from being large, so that strain generated in the bead portion is reduced. In the tire 2, bead durability is improved. From this viewpoint, the angle θ is more preferably not less than 26 degrees.

When the angle θ is set to be not greater than 30 degrees, deformation of the carcass 12 at the bead portion when the tire 2 is inflated is suppressed, so that strain generated in the bead portion is reduced. In the tire 2, good bead durability is maintained. From this viewpoint, the angle θ is more preferably not greater than 29 degrees.

Figure 5:
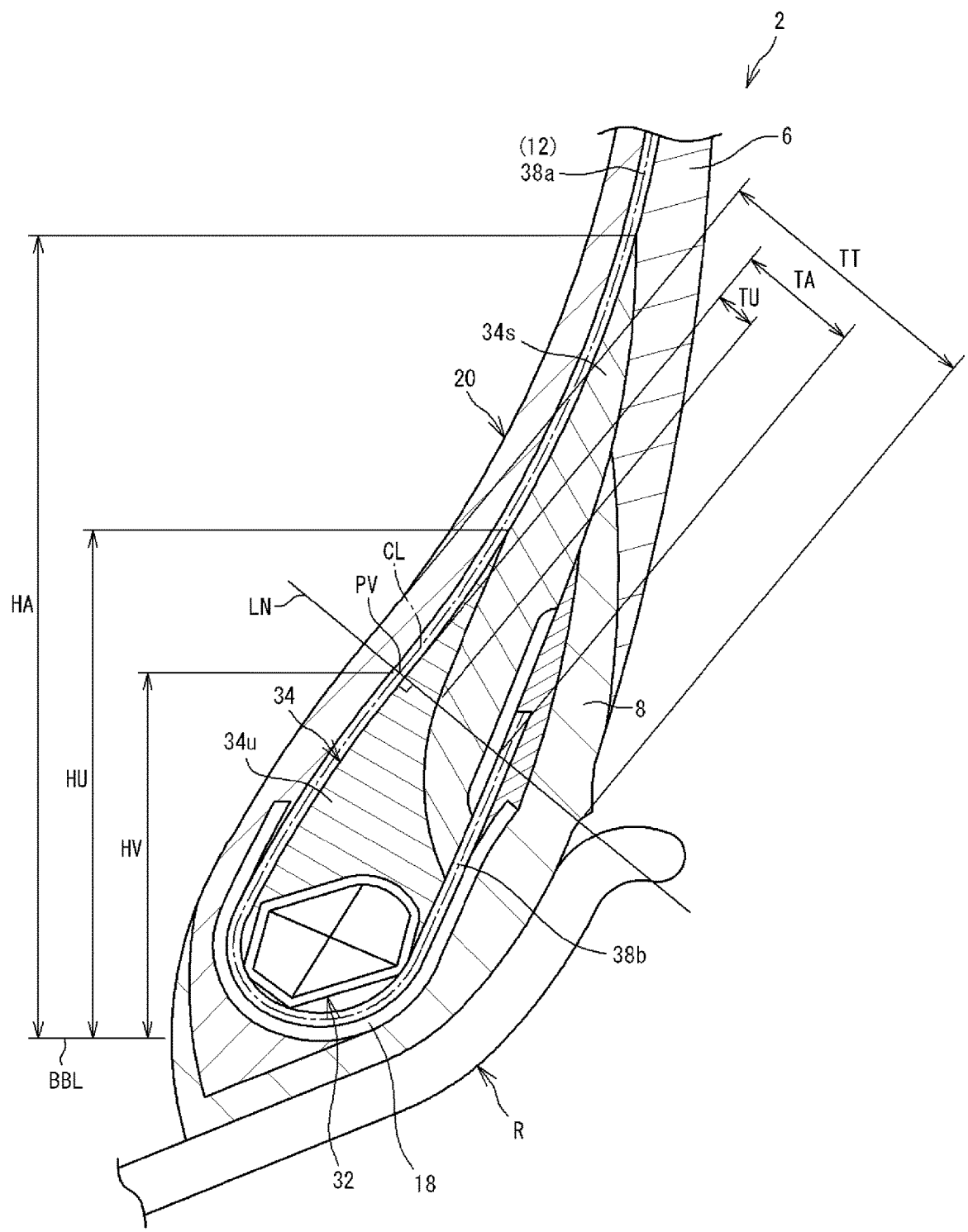
FIG. 5 is a cross-sectional view showing a bead portion.

FIG. 5 shows the bead portion of the tire 2 shown in FIG. 1.

In FIG. 5, a solid line LN is a normal line that is normal to the interface between the ply body 38a of the carcass 12 and the apex 34 and passes through the inflection point PV specified in the case line CL in the reference state.

A length indicated by reference sign TT is the thickness of the tire 2 measured along the normal line LN. In the present disclosure, the thickness TT is the thickness of the tire 2 at the inflection point PV.

A length indicated by reference sign TA is the thickness of the apex 34 measured along the normal line LN. In the present disclosure, the thickness TA is the thickness of the apex 34 at the inflection point PV.

When each thickness is measured in the cross-section of the tire 2 obtained by cutting the tire 2 along the plane including the rotation axis of the tire 2, a position, from the end of the turned-up portion 38b in the case line CL shown in FIG. 2, having a length equal to the length from the end of the turned-up portion 38b to the inflection point PV is used as the position of the inflection point PV.

In the tire 2, the ratio (TA/TT) of the thickness TA of the apex 34 to the thickness TT of the tire 2 at the inflection point PV is preferably not less than 42% and not greater than 50%.

When the ratio (TA/TT) is set to be not less than 42%, the apex 34 effectively increases the stiffness of the bead portion. Accordingly, strain generated in the bead portion is reduced. In the tire 2, bead durability is improved. From this viewpoint, the ratio (TA/TT) is more preferably not less than 44%.

When the ratio (TA/TT) is set to be not greater than 50%, deformation of the carcass 12 at the bead portion when the tire 2 is inflated is suppressed. Strain generated in the bead portion is reduced. In the tire 2, good bead durability is maintained. From this viewpoint, the ratio (TA/TT) is more preferably not greater than 49%.

In the tire 2, the above-described normal line LN also intersects the inner apex 34u. In FIG. 5, a length indicated by reference sign TU is the thickness of the inner apex 34u measured along the normal line LN. In the present disclosure, the thickness TU is the thickness of the inner apex 34u at the inflection point PV.

In the tire 2, from the viewpoint of improvement of bead durability, the ratio (TU/TA) of the thickness TU of the inner apex 34u to the thickness TA of the apex 34 at the inflection point PV is preferably not less than 0.30 and more preferably not less than 0.35. The ratio (TU/TA) is preferably not greater than 0.45 and more preferably not greater than 0.40.

In FIG. 5, a length indicated by reference sign HV is the distance in the radial direction from the bead base line BBL to the inflection point PV specified in the case line CL in the reference state. The distance HV in the radial direction is an inflection point height. A length indicated by reference sign HA is the distance in the radial direction from the bead base line BBL to the outer end of the apex 34. The distance HA in the radial direction is an apex height. A length indicated by reference sign HU is the distance in the radial direction from the bead base line BBL to the outer end of the inner apex 34u. The distance HU in the radial direction is an inner apex height.

In the tire 2, the ratio (HA/HV) of the apex height HA to the inflection point height HV is preferably not less than 2.0 and not greater than 2.4.

When the ratio (HA/HV) is set to be not less than 2.0, the apex 34 effectively increases the stiffness of the bead portion. Accordingly, strain generated in the bead portion is reduced. In the tire 2, bead durability is improved. From this viewpoint, the ratio (HA/HV) is more preferably not less than 2.1.

When the ratio (HA/HV) is set to be not greater than 2.4, deformation of the carcass 12 at the bead portion when the tire 2 is inflated is suppressed. Strain generated in the bead portion is reduced. In the tire 2, good bead durability is maintained. From this viewpoint, the ratio (HA/HV) is more preferably not greater than 2.3.

In the tire 2, the ratio (HU/HV) of the inner apex height HU to the inflection point height HV is preferably not less than 1.2 and not greater than 1.6.

When the ratio (HU/HV) is set to be not less than 1.2, the inner apex 34u effectively increases the stiffness of the bead portion. Accordingly, strain generated in the bead portion is reduced. In the tire 2, bead durability is improved. From this viewpoint, the ratio (HU/HV) is more preferably not less than 1.3.

When the ratio (HU/HV) is set to be not greater than 1.6, deformation of the carcass 12 at the bead portion when the tire 2 is inflated is suppressed. Strain generated in the bead portion is reduced. In the tire 2, good bead durability is maintained. From this viewpoint, the ratio (HU/HV) is more preferably not greater than 1.5.

Figure 6:
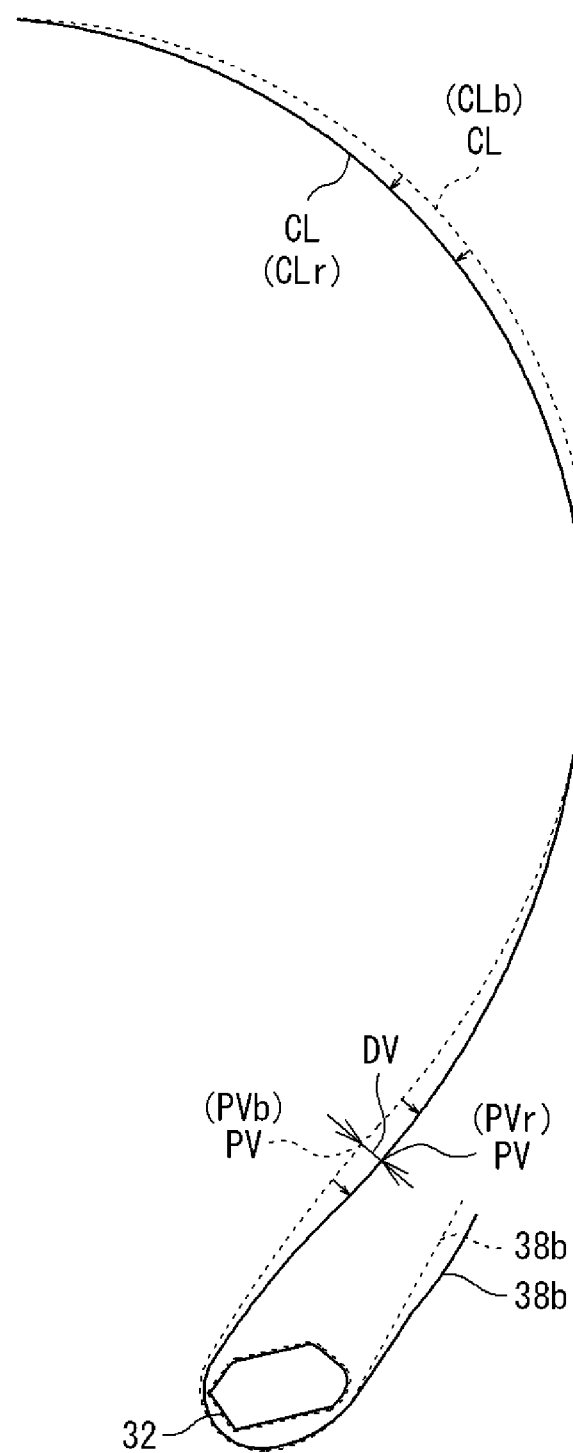
FIG. 6 is a cross-sectional view illustrating movement of an inflection point.

FIG. 6 shows the case line CL in the meridian cross-section of the tire 2. FIG. 6 shows movement of the case line CL when the state of the tire 2 is changed from the reference state to the normal state, in other words, when the tire 2 is fitted on the rim R and the internal pressure of the tire 2 is changed from 50 kPa to the normal internal pressure.

In FIG. 6, a dotted line CLb represents the case line CL in the reference state, and a solid line CLr represents the case line CL in the normal state. In FIG. 6, a position indicated by reference sign PVb is the position of the inflection point PV in the case line CL in the reference state, and a position indicated by reference sign PVr is the position of the inflection point PV in the case line CL in the normal state. The position PVr of the inflection point PV in the case line CL in the normal state is specified by the position having a length from the end of the turned-up portion 38b is equal to the length from the end of the turned-up portion 38b to the position PVb of the inflection point PV in the case line CL in the reference state.

As shown in FIG. 6, by changing the state of the tire 2 from the reference state to the normal state, the case line CL around the boundary between the tread portion and the side portion moves inwardly, and the case line CL at the bead portion moves outwardly. In FIG. 6, an arrow indicated by reference sign DV is the movement distance of the inflection point PV. The movement distance DV is represented by the length of a line segment connecting the position PVb and the position PVr.

As described above, in the tire 2, the position of the inflection point PV which is the boundary between the curved portion 44 and the inversely curved portion 46 controls movement of the case line CL, and in particular, movement of the case line CL at the bead portion is suppressed. Specifically, the movement distance DV of the inflection point PV when the tire 2 is fitted on the rim R and the internal pressure of the tire 2 is changed from 50 kPa to the normal internal pressure is not greater than 5 mm. In the tire 2, deformation of the carcass 12 at the bead portion when the tire 2 is inflated is suppressed. Strain generated in the bead portion is reduced. In the tire 2, good bead durability is maintained. From this viewpoint, the movement distance DV is preferably not greater than 3 mm.

The following will describe a production method for the tire 2. In the production of the tire 2, an uncrosslinked tire 2, that is, a green tire, for the tire 2 shown in FIG. 1 is prepared by combining members such as the tread 4 and the sidewalls 6 on a forming machine (not shown). The tire 2 is obtained by pressurizing and heating the green tire in a mold of a vulcanizer described later. The production method for the tire 2 includes a step of preparing a green tire that is in an unvulcanized state of the tire 2, and a step of pressurizing and heating the green tire in a mold.

Figure 7:
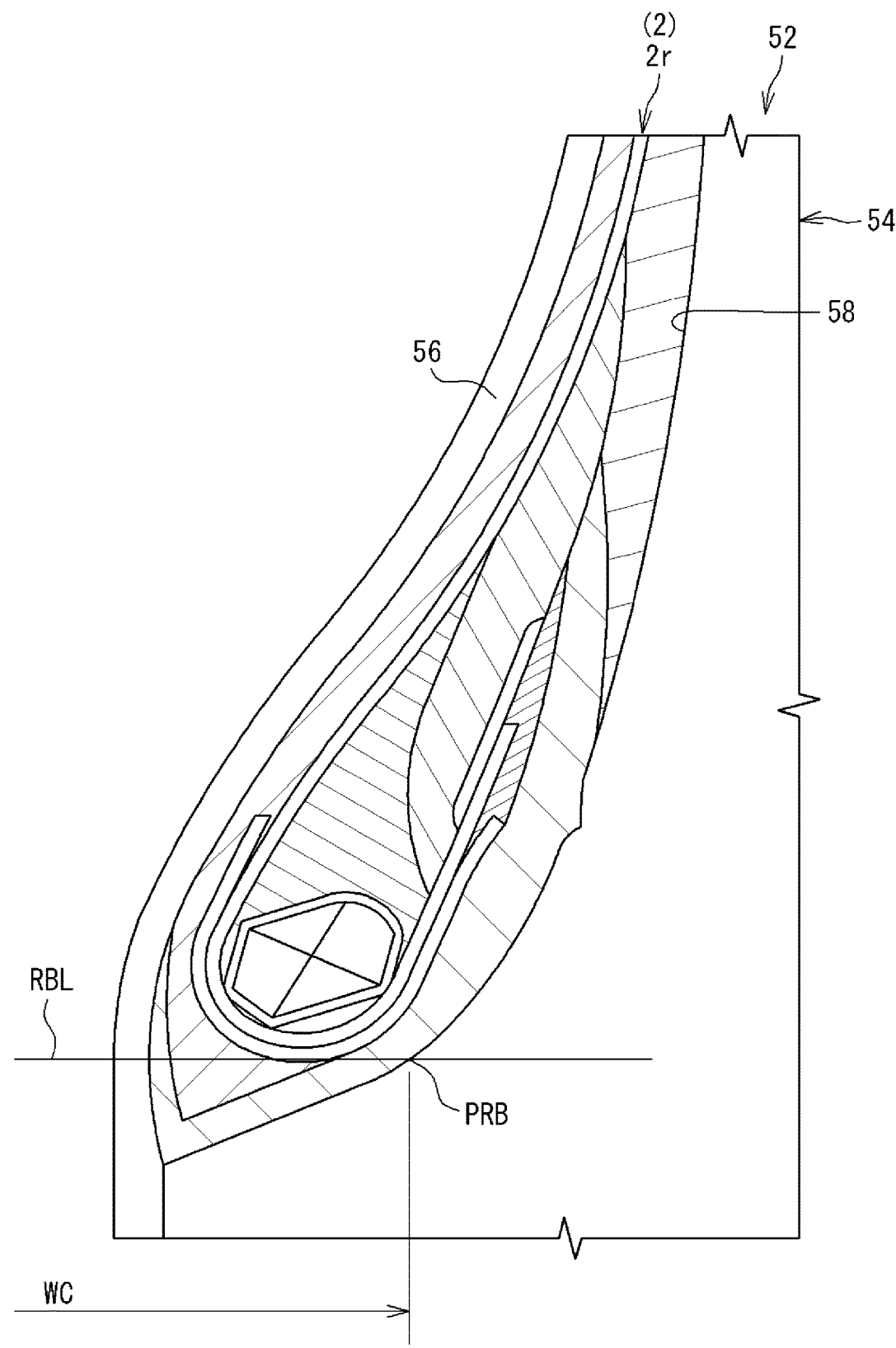
FIG. 7 is a cross-sectional view illustrating a production method for the tire.

FIG. 7 shows a part of a vulcanizer 52 used in the production method for the tire 2. In FIG. 7, the right-left direction corresponds to the axial direction of the tire 2, and the up-down direction corresponds to the radial direction of the tire 2. The direction perpendicular to the surface of the drawing sheet of FIG. 7 is the circumferential direction of the tire 2.

In the present disclosure, for convenience of description, the vulcanizer 52 will be described on the basis of the dimensions of the tire 2.

In the production method for the tire 2, a green tire 2r is vulcanized in the vulcanizer 52. The vulcanizer 52 includes a mold 54 and a bladder 56.

The mold 54 has a cavity surface 58 on the inner surface thereof. The cavity surface 58 comes into contact with the outer surface of the green tire 2r and shapes the outer surface of the tire 2. Although not described in detail, the mold 54 is a segmented mold.

The bladder 56 is located inside the mold 54. The bladder 56 is formed from a crosslinked rubber. The interior of the bladder 56 is filled with a heating medium such as steam or a pressurizing medium such as nitrogen gas. Accordingly, the bladder 56 expands. The bladder 56 shown in FIG. 7 is in a state where the bladder 56 is filled with the heating medium to be expanded. The bladder 56 comes into contact with the inner surface of the green tire 2r and shapes the inner surface of the tire 2. In the production method for the tire 2, a rigid core (not shown) made of metal may be used instead of the bladder 56. The rigid core has a toroidal outer surface. The shape of this outer surface is approximated to the shape of the inner surface of the tire 2 in a state where the tire 2 is filled with air and the internal pressure of the tire 2 is maintained at 5% of the normal internal pressure.

In the production of the tire 2, the green tire 2r is placed into the mold 54 that is set at a predetermined temperature. Thereafter, the mold 54 is closed. The bladder 56 expanded by the filling with the heating medium presses the green tire 2r against the cavity surface 58 from the inside. The bladder 56 expanded by the filling with the pressurizing medium further presses the green tire 2r against the cavity surface 58 from the inside. The green tire 2r is pressurized and heated inside the mold 54 for a predetermined time. Accordingly, the rubber composition of the green tire 2r is cross-linked to obtain the tire 2.

In FIG. 7, a solid line RBL is a reference line corresponding to the above-described bead base line BBL. This reference line is also referred to as bead ring line. Reference sign PRB indicates the point of intersection of the bead ring line RBL and the cavity surface 58. The point of intersection PRB is also referred to as clip width reference point. A length indicated by reference sign WC is the distance in the axial direction from a first clip width reference point PRB to a second clip width reference point PRB. The distance WC in the axial direction is a clip width of the mold 54. The clip width WC corresponds to a rim width WR of the rim R onto which the tire 2 obtained by the mold 54 is fitted.

In the production method, the clip width WC of the mold 54 is larger than the rim width WR of the rim R. Specifically, the ratio (WC/WR) of the clip width WC to the rim width WR is not less than 1.02 and not greater than 1.17.

When fitting the tire 2 onto the rim R, the interior of the tire 2 is filled with air. Accordingly, each bead portion moves in the axial direction on the seat RS of the rim R, and this bead portion comes into contact the flange RF of the rim R. As a result, the tire 2 is fitted on the rim R.

In the production method, since the ratio (WC/WR) is not less than 1.02, the internal pressure of the tire 2 is maintained at an appropriate pressure without becoming excessively high when fitting the tire 2 produced by the mold 54 onto the rim R. The tire 2 is easily fitted onto the rim R. From this viewpoint, the ratio (WC/WR) is preferably not less than 1.05.

Since the ratio (WC/WR) is not greater than 1.17, the case line CL having an appropriate shape is formed in the tire 2 produced by the mold 54. The mold 54 contributes to forming the inflection point PV of the case line CL at the above-described position. In the tire 2, deformation of the carcass 12 at the bead portion when the tire 2 is inflated is effectively suppressed, so that strain generated in the bead portion is reduced. In the tire 2, improvement of bead durability is achieved. From this viewpoint, the ratio (WC/WR) is preferably not greater than 1.13 and more preferably not greater than 1.10.

In the tire 2 obtained by the production method, improvement of bead durability is achieved. In addition, for the tire 2, measures such as increasing the thickness of a component included in the bead portion and newly adding a component such as a filler do not need to be taken in order to improve bead durability.

As is obvious from the above description, according to the present invention, the heavy duty tire 2 that can achieve improvement of bead durability without causing an increase in rolling resistance is obtained.

INDUSTRIAL APPLICABILITY

The above-described technology capable of achieving improvement of bead durability without causing an increase in rolling resistance can be applied to various tires.

REFERENCE SIGNS LIST 2 tire
2r green tire
4 tread
6 sidewall
10 bead
12 carcass
32 core
32m core body
34 apex
34u inner apex
34s outer apex
34p ply edge strip
38 carcass ply 38a ply body
38b turned-up portion
42 carcass cord
44 curved portion
46 inversely curved portion
54 mold
58 cavity surface

The invention claimed is:

1. A heavy duty tire comprising a pair of beads and a carcass extending on and between a first bead and a second bead out of the pair of beads, wherein
    each of the beads includes a core and an apex located radially outward of the core,
    the carcass includes a carcass ply,
    the carcass ply includes a large number of carcass cords aligned with each other,
    each of the carcass cords is a steel cord,
    in a meridian cross-section of the tire, a contour of the carcass includes an outwardly bulging curved portion and an inwardly recessed inversely curved portion located radially inward of the curved portion,
    the inversely curved portion is connected to the curved portion,
    a boundary between the curved portion and the inversely curved portion is an inflection point,
    a part or an entirety of the curved portion is represented by a first arc including the inflection point,
    a part or an entirety of the inversely curved portion is represented by a second arc including the inflection point,
    the first arc and the second arc are tangent to each other at the inflection point,
    a ratio of a distance in an axial direction from an equator plane of the tire to the inflection point to a distance in the axial direction from the equator plane to an axially outer end of the contour of the carcass is not less than 70% and not greater than 85%,
    a ratio of a distance in a radial direction from a bead base line of the tire to the inflection point to a distance in the radial direction from the bead base line to a point of intersection of the contour of the carcass and the equator plane is not less than 15% and not greater than 22%,
    the apex includes an inner apex and an outer apex located radially outward of the inner apex,
    the inner apex has an outer end tapered outward in the radial direction,
    the carcass ply has a ply body which extends between the cores of the beads, and a pair of turned-up portions which are connected to the ply body and turned up around the respective cores from the inner side toward the outer side in the axial direction,
    the inflection point is located, in the axial direction, between a radially outer end of the core and the outer end of the inner apex, and the inflection point is located, in the radial direction, between an end of the turned-up portion and the outer end of the inner apex, and
    a normal line being normal to an interface between the ply body of the carcass and the apex and passing through the inflection point, intersects the turned-up portion.

2. The heavy duty tire according to claim 1, wherein
    the core includes a core body,
    the core body includes a wire wound in a circumferential direction,
    the core body has a bottom surface located so as to face a seat of a rim onto which the tire is fitted,
    in the meridian cross-section of the tire, a contour of the bottom surface is represented by a straight line, and
    an angle formed between a tangent line that is tangent to the contour of the carcass at the inflection point and the straight line representing the contour of the bottom surface is not less than 25 degrees and not greater than 30 degrees.

3. The heavy duty tire according to claim 1, wherein a ratio of a thickness of the apex to a thickness of the tire at the inflection point is not less than 42% and not greater than 50%.

4. The heavy duty tire according to claim 1, wherein a movement distance of the inflection point when the tire is fitted on a rim and an internal pressure of the tire is changed from 50 kPa to a normal internal pressure is not greater than 5 mm.

5. The heavy duty tire according to claim 1, wherein a ratio of a thickness of the inner apex to a thickness of the apex at the inflection point is not less than 0.30 and not greater than 0.45.

6. The heavy duty tire according to claim 1, wherein a ratio of a distance in the radial direction from the bead base line to an outer end of the apex to the distance in the radial direction from the bead base line to the inflection point is not less than 2.0 and not greater than 2.4.

7. The heavy duty tire according to claim 1, wherein a ratio of a distance in the radial direction from the bead base line to an outer end of the inner apex to the distance in the radial direction from the bead base line to the inflection point is not less than 1.2 and not greater than 1.6.

8. The heavy duty tire according to claim 1, further comprising a pair of chafers located axially outward of the bead and coming into contact with a rim, and a pair of sidewalls located axially outward of the carcass and radially outward of the chafers,
    a radially inner end of each of the sidewalls is located radially inward of a radially outer end of a corresponding chafer of the chafers, and
    the radially inner end of the sidewall is located radially outward of the normal line being normal to the interface between the ply body of the carcass and the apex and passing through the inflection point.

9. The heavy duty tire according to claim 1, further comprising a pair of chafers located axially outward of the bead and coming into contact with a rim, and a pair of steel fillers located between the chafers and the carcass,
    each of the steel fillers is turned up around the core from an inner side toward an outer side in the axial direction along the carcass ply, and
    an entirety of each steel filler is located radially inward of the normal line being normal to the interface between the ply body of the carcass and the apex and passing through the inflection point.

10. The heavy duty tire according to claim 1, further comprising a pair of chafers located axially outward of the bead and coming into contact with a rim, a pair of sidewalls located axially outward of the carcass and radially outward of the chafers, and a pair of steel fillers located between the chafers and the carcass,
    a radially inner end of each of the sidewalls is located radially inward of a radially outer end of a corresponding chafer of the chafers,
    the radially inner end of the sidewall is located radially outward of the normal line being normal to the interface between the ply body of the carcass and the apex and passing through the inflection point, each of the steel fillers is turned up around the core from an inner side toward an outer side in the axial direction along the carcass ply, and an entirety of each steel filler is located radially inward of the normal line being normal to the interface between the ply body of the carcass and the apex and passing through the inflection point.

* * * * *